(12) United States Patent
Moustafa et al.

(10) Patent No.: US 9,828,487 B2
(45) Date of Patent: Nov. 28, 2017

(54) LIQUID COMPOSITIONS OF OVERBASED CALCIUM CARBOXYLATE AND PROCESS FOR ITS PREPARATION

(71) Applicants: Tarek Moustafa, Mohandeseen (EG); Eslam Moustafa, Mohandeseen (EG)

(72) Inventors: Tarek Moustafa, Mohandeseen (EG); Eslam Moustafa, Mohandeseen (EG)

(73) Assignee: DELTA SPECIALTIES, Ei-Sahafeen, Mohandeseen, A. (EG)

( * ) Notice: Subject to any disclaimer, the term of this patent is extended or adjusted under 35 U.S.C. 154(b) by 0 days.

(21) Appl. No.: 13/836,286

(22) Filed: Mar. 15, 2013

(65) Prior Publication Data
US 2014/0261087 A1 Sep. 18, 2014

(51) Int. Cl.
*C10M 129/26* (2006.01)
*C08K 5/098* (2006.01)
*C10M 121/04* (2006.01)

(52) U.S. Cl.
CPC .......... *C08K 5/098* (2013.01); *C10M 121/04* (2013.01); *C10M 129/26* (2013.01)

(58) Field of Classification Search
CPC  C10M 129/26; C10M 177/00; C10M 220/26; C10M 2227/00; C10M 2290/00; C10M 121/04
See application file for complete search history.

(56) References Cited

U.S. PATENT DOCUMENTS

| | | | |
|---|---|---|---|
| 2,616,904 A | 11/1952 | Asseff et al. | |
| 2,760,970 A | 8/1956 | LeSuer | |
| 2,767,164 A | 10/1956 | Asseff et al. | |
| 2,798,852 A | 7/1957 | Wiese et al. | |
| 2,802,816 A | 8/1957 | Asseff et al. | |
| 2,865,956 A | 12/1958 | Rhuddian et al. | |
| 2,938,828 A | 5/1960 | Van der et al. | |
| 3,027,325 A | 3/1962 | McMillen et al. | |
| 3,031,284 A | 4/1962 | Andress et al. | |
| 3,342,733 A | 9/1967 | Robbins et al. | |
| 3,533,975 A | 10/1970 | Scullin | |
| 3,773,664 A | 11/1973 | LeSuer | |
| 3,779,922 A | 12/1973 | LeSuer | |
| 4,100,084 A | 7/1978 | Powers, III | |
| 4,225,509 A | 9/1980 | Seth | |
| 4,597,880 A | 7/1986 | Eliades | |
| 4,824,585 A * | 4/1989 | Marotel et al. | ............... 508/460 |
| 5,501,807 A * | 3/1996 | Benda et al. | ................. 508/460 |
| 5,830,832 A | 11/1998 | Benda et al. | |
| 2007/0105730 A1* | 5/2007 | Boons et al. | ................. 508/460 |

* cited by examiner

*Primary Examiner* — Taiwo Oladapo
(74) *Attorney, Agent, or Firm* — Schwabe, Williamson & Wyatt, P.C.; Aaron Haleva

(57) ABSTRACT

The present invention relates to light color, shelf-stable liquid compositions of overbased calcium carboxylate soaps and a process for their preparation. The inventive soaps are prepared by neutralizing calcium base in a mixture of two different aliphatic carboxylic acids and carbonating the mixture in the presence of a non-polar hydrocarbon solvent and a polar organic solvent as a promoter under controlled temperature conditions. The overbased calcium carboxylate soaps of the invention contain 20%-90% by weight of $C_7$ to $C_{25}$ saturated carboxylic acids, which are branched on carbon 2, and between 1% and 20% by weight short chain saturated carboxylic acids. These liquid compositions have light colors and excellent heat stability. They can be used as anticorrosion/antirust additives, and paint dryers and stabilizers, in paints, coatings and lubricants, as well as other applications.

9 Claims, No Drawings

LIQUID COMPOSITIONS OF OVERBASED CALCIUM CARBOXYLATE AND PROCESS FOR ITS PREPARATION

FIELD OF THE INVENTION

This invention generally relates generally to liquid compositions of calcium carboxylate soaps with a high basicity index, commonly called overbased calcium soaps. In particular, this invention relates to light color, shelf-stable liquid compositions of overbased calcium carboxylate soaps and a process for their preparation. By light color it is meant having a clear yellow or amber color, and by shelf-stable is meant being capable of storage in a closed container at room temperature for at least 90 days without suffering visible gelatization, clotting or precipitation.

BACKGROUND OF THE INVENTION

The preparation of overbased calcium salts of carboxylic acids, alkyl phenols, and sulfonic acids are disclosed in the U.S. Pat. Nos. 2,616,904; 2,760,970; 2,767,164; 2,798,852; 2,802,816; 3,027,325; 3,031,284; 3,342,733; 3,533,975; 3,773,664; and 3,779,922. As described therein, the widely used overbased calcium soaps are either salts of alkylarylsulphonic acids, oleic acid, naphthenic acids, or branched saturated oxo-acids of $C_7$ to $C_{25}$ hydrocarbons.

U.S. Pat. Nos. 2,865,956; 2,938,828; and 4,100,084 report various methods of producing calcium naphthenates. These products often have relatively slow filtration rates and contain considerable amounts of solids, predominantly non-dispersible, agglomerated calcium carbonate particles which require measures for their removal. The overbased naphthenates are often dark in color which limits their use in applications where discoloration is a problem, such as in paints and coatings. The preparation of these compounds typically involves two reactions and can be summarized as follows:

1) Preparation of Calcium Naphthenate:

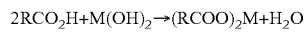

2) Overbasing:

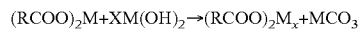

In which:
M is a metal
X ranges from 1 to 10
R is a hydrocarbyl radical of 15 to 40 carbon atoms.
Step 2 takes place in the presence of $CO_2$ gas and a solvent.

The preparation of the overbased salts using alkylarylsulphonic acid is a difficult process. Typically the process involves the reaction the alkylarylsulphonic acid with a metal oxide or hydroxide in a suitable solvent.

U.S. Pat. No. 4,225,509 teaches an overbased alkaline earth metal hydrocarbyl sulfonate which is made in the presence of carbon dioxide ($CO_2$) and promoters. The promoters are usually labile hydrogen compounds such as phenols, alcohols and amino-alcohols. Products prepared by such method have dark colors and it is difficult for them to reach high metal content.

U.S. Pat. No. 4,597,880 discloses a one-step process for preparation of overbased calcium sulfonate greases. The essential ingredients include a mixture of a liquid carrier, a sulfonic acid, calcium oxide or hydroxide, water-soluble carboxylic acids, preferably an alcohol or alkoxyalcohol of 1 to 8 carbon atoms, and water, wherein the mixture is carbonated. Calcium soaps from this method of preparation cannot be used in paint applications because of dark color.

In U.S. Pat. No. 4,824,585, overbased calcium soaps having a basicity of about 4 are described which overcome the disadvantages of the known soaps and which yield stable and clear solutions in oil. As used above and throughout this application, basicity is the total amount of calcium in a product divided by the amount of calcium linked to carboxylic acid compounds. The products described in this patent are made by carbonation of excess of calcium hydroxide dispersed in a reaction medium containing an oil-soluble organic acid, a hydrocarbon solvent, a low molecular weight alcohol, and mineral oil, followed by filtration of the unreacted materials. Carbonation is carried out in the presence of catalysts such as metal oxides and zinc carboxylates and promoters of higher alcohols, glycols, alky-phenols or amines. These compounds remain in the finished product and the presence of the catalyst and oil in the finished product can limit its use.

In the U.S. Pat. Nos. 4,824,585, 5,501,807 and 5,830,832, high basicity calcium soaps are obtained by carbonating a mixture of a $C_7$ to $C_{15}$ carboxylic acid, which is preferably a branched chain oxo-acid in the presence of excess calcium and a volatile solvent at a temperature from 15° to 60° C. Products with basicity of 4 to 8 may be obtained. These patents teach the use of saturated oxo-acids in high concentrations in the range of 50% or more by weight, and of using mono-or poly-substitution on carbon 3 or higher of the carboxylic acid. These patents limit the percentage of acids branched on carbon 2 to between 0% and 20% by weight of the total acid.

Several unsuccessful examples have been reported wherein a high percentage of the acid substituted on carbon 2 was used. To the knowledge of the present inventors, carboxylic acids with carbon numbers less than 7 have not been proposed for use in the preparation of overbased calcium soaps.

SUMMARY OF THE INVENTION

One object of the present invention is to provide shelf-stable, light color liquid compositions of overbased calcium carboxylate soaps which comprise:
$C_7$ to $C_{25}$ saturated carboxylic acids, which are branched on carbon 2, of between 20% to 90% by weight, and short chain saturated carboxylic acids of between 1% to 20% by weight.

Another object of the present invention is to provide a process for preparation of a liquid compositions of overbased calcium carboxylate soaps includes the steps of:
(a) Preparing a mixture of aliphatic carboxylic acids which after mixing in of the solvents contains: between 20% to 90% by weight of $C_7$ to $C_{25}$ carboxylic acids which are branched on carbon 2, and between 1% to 20% by weight of short chain saturated acids, in a non-polar organic solvent, a polar organic solvent, and an amount of calcium base sufficient to neutralize the acids;
(b) neutralizing the acids in mixture with the calcium base;
(c) heating the acid neutralized mixture to a temperature sufficient to evaporate water from the mixture to a dryness of 0.1% by weight water or less;
(d) cooling the dried calcium carboxylate mixture to a temperature in the range of about 50° C. to 90° C.;
(e) overbasing cooled mixture by adding additional calcium base dispersed in a polar organic solvent;
(f) carbonating the overbased mixture by bubbling carbon dioxide gas through the mixture, and;

(g) heating the carbonated product at a temperature sufficient to exporate at least part of the polar solvent and to reduce the concentration of water in the carbonated product to a dryness of 0.1% by weight water or less.

The liquid compositions produced by this method have high clarity, light color, extended shelf life and are easily filtered.

Further features and advantages of the present invention will become apparent from consideration of the following description and the appended claims.

DETAILED DESCRIPTION OF THE INVENTION

In a preferred embodiment of the invention, a shelf-stable, light color liquid composition of overbased calcium carboxylate soap contains:
at least one non-polar organic solvent,
at least one polar organic solvent,
between 20% to 90% by weight of $C_7$ to $C_{25}$ saturated carboxylic acids, which are branched on carbon 2,
between 1% to 20% by weight of $C_2$ to $C_6$ saturated carboxylic acids;

The long chain saturated from $C_7$ to $C_{25}$ carboxylic acids, which are branched on carbon 2, are preferably selected from the group consisting of 2-ethylhexanoic acid, neoheptanoic, neodecanoic acid and neononanoic acid. The most preferred long chain carboxylic acid is 2-ethylhexanoic acid.

The short chain $C_2$ to $C_6$ carboxylic acids are preferably selected from the group consisting of acetic acid, propionic acid, butyric acid, isobutyric acid, pentanoic acid, valeric acid, isopentanoic acid, isohexanoic acid and neohexanoic acid.

The non-polar organic solvent preferably contains at least one of the following: hexane, kerosene, naphtha, benzene, toluene, ethylbenzene or xylene, or a mixture of paraffinic hydrocarbons of mineral or synthetic origin, such as mineral spirits. Most preferably it containing a low proportion of not more than 30% by weight of aromatic and/or naphthenic hydrocarbons. This organic hydrocarbon liquid represent about 10% to 70% by weight of the total formulation.

The polar organic solvent used in the composition are preferably $C_1$ to $C_6$ alcohols, The liquid compositions according to the present invention may contain between about 1% to about 60% by weight of the polar organic solvent, for example methanol, 1-butanol, 2-butanol, or glycols, such as ethylene glycol, propylene glycol, diethylene glycol, dipropylene glycol and triethylene glycol. It also can be a glycol ether, such as ethylene glycol monobutyl ether, diethylene glycol monobutyl ether, propylene glycol monomethyl ether and dipropylene glycol monomethyl ether. It also can be a mixture of polar alcohols and/or glycols or a mixture of polar alcohols and/or glycol ethers. It also can be amines, for example, aniline, phenylenediamine, dodecylamine and mixtures thereof. It also can be a mixture of alcohols and/or amines, for example a mixture of methanol and aqueous ammonia. Most preferably the polar solvent is methanol, glycols and/or glycol ethers. If the polar organic solvent utilized is a single compound, it should preferably have a boiling point which at least 120° C. When the polar organic solvent of the invention is comprised of two or more different polar organic compounds, one or more of those polar compounds will preferably have a boiling point which is below 120° C. In the case of a polar organic solvent which is comprised of multiple different polar organic compounds, it is preferred that at least one of the compounds have a boiling point which is 120° C. or higher.

In another preferred form of the invention, a process for preparation of a liquid compositions of overbased calcium carboxylate soap is disclosed which comprises the steps of:

(a) preparing a mixture of aliphatic saturated carboxylic acids comprising: between 20% to 90% by weight of $C_7$ to $C_{25}$ saturated carboxylic acids which are branched on carbon 2, between 1% to 20% by weight of $C_2$ to $C_6$ carboxylic acids, between 10% to 70% by weight of a non-polar organic solvent, and between 1% to 60% of polar organic solvent;

(b) dispersing an amount of calcium base sufficient to neutralize the acids in the mixture of step (a) and neutralizing the acids in the mixture with the calcium base;

(c) heating the neutralized composition at a temperature sufficient to evaporate the water in the mixture to a dried composition containing not more than 0.1% water;

(d) cooling the dried composition;

(e) overbasing the cooled dried composition by adding additional calcium base dispersed in polar solvent;

(f) carbonating the overbased mixture by sparging carbon dioxide gas through the mixture; and (g) heating the carbonated product to remove water therefrom to a dryness of not more than 0.1% and part of the polar solvent.

In a preferred embodiment of the process of the present invention, in above step (b) calcium oxide and/or hydroxide with a molar equivalence to the carboxylic acids is reacted with at least two organic saturated carboxylic acids at a temperature of about 40° C.-90° C., wherein one of the acids is a short chain acid with a carbon number ranging from $C_2$ to $C_6$ in which the short chain acid is between 1% and 20% by weight of the total acid. In the described preferred embodiment, the saturated aliphatic $C_7$ to $C_{25}$ carboxylic acids, which are branched on carbon 2 are between 20% and 90% by weight of the total acids.

It is an important feature of the invention that the step of neutralization be performed in the presence of at least one non-polar organic solvent and at least one polar organic solvent.

After the neutralization step, the resulting composition is heated to about 100° C.-150° C. to evaporate the water of neutralization. The dried composition is then cooled to about 50° C.-90° C. and the additional calcium oxide/hydroxide in a polar organic solvent added.

The carbonation step is then performed by sparging carbon dioxide gas through the reaction mixture at a temperature between 15° C. and 90° C., and preferably between about 35° C. to about 85° C. After this step, the reaction mixture is heated to about 100° C.-50° C. to evaporate water and possibly part of the polar solvent.

Diluents may be added, if needed. Suitable diluents are selected from oils, aromatics, and aliphatics, but aliphatic diluents are preferred. After the second water removal step, the product is filtered.

The molar ratio of calcium base to organic carboxylic acids used in the neutralizing reaction and the overbasing steps is selected such that the basicity index of the overbased product is greater than 1 and up to 4.

The duration of the carbonation step is preferably between 1 and 8 hours, and most preferably 4 hours, and the hourly mass ratio of carbon dioxide sparged to calcium hydroxide in the mixture is between 0.05 and 0.5, and preferably between 0.1 and 0.4.

The long chain saturated carboxylic acids used in the this invention are $C_7$ to $C_{25}$ carboxylic acids, which are branched on carbon 2. Preferably they are selected from the group consisting of 2-ethylhexanoic acid, neoheptanoic, neodecanoic acid and neononanoic acid.

The short chain carboxylic acids containing from 2 to 6 carbon atoms used in the invention are preferably selected from the group consisting of acetic acid, propionic acid, butyric acid, isobutyric acid, pentanoic acid, valeric acid, isopentanoic acid, isohexanoic acid and neohexanoic acid.

The non-polar organic hydrocarbon solvent used in the invention preferably contains at least one hydrocarbon selected from the group consisting of hexane, kerosene, naphtha, benzene, toluene, ethylbenzene or xylene. It is also possible to use a mixture of paraffinic hydrocarbons of mineral or synthetic origin, preferably containing a low proportion of aromatic and/or naphthenic hydrocarbons, such as mineral spirit. The non-polar organic hydrocarbon solvent should comprise about 10% to about 70% by weight of the final overbased product.

The polar organic solvent used as a promoter and possibly to enhance water evaporation can be $C_1$ to $C_6$ alcohols, for example methanol, 1-butanol and 2-butanol. It also can be a glycol, such as—ethylene glycol, propylene glycol, diethylene glycol, dipropylene glycol and triethylene glycol. It also can be a glycol ether, such as—ethylene glycol monobutyl ether, diethylene glycol monobutyl ether, propylene glycol monomethyl ether and dipropylene glycol monomethyl ether. It also can be a mixture of alcohols and/or glycol or a mixture of alcohols and/or glycol ethers. It also can be amines, for example—aniline, phenylenediamine, dodecylamine and mixtures thereof. It also can be a mixture of alcohols and/or amines, for example of methanol and aqueous ammonia.

The preferred polar solvent is methanol, glycols and glycol ethers, which provide the highest basicities and the shortest filtration time.

A portion of the polar organic solvent is removed during the final drying step of the invention. The polar organic solvent will comprise about 1% to about 60% by weight of the final overbased product.

The invention is illustrated but not limited by the following examples.

Example 1

In a flask fitted with an efficient mechanical stirrer, a Dean stark apparatus and a heating mantle, 152.24 g of a mineral spirit, 60 g of butyl di-glycol and 0.66 g of zinc octoate 10% were charged. 31.5 g of calcium hydroxide 96% was added slowly to allow its good dispersion in the liquid. The temperature was adjusted at 60° C. at which point a mixture of 86.52 g of 2-ethylhexanoic acid and 14.8 g of propionic acid were added drop-wise over 20 min. The mixture was then heated to 140° C. over a period of 45 minutes while the water of neutralization was distilled off. The dried mixture was then cooled and 80 g of methanol followed by 45.58 g of calcium hydroxide were added. Carbon dioxide injection was then started at a rate of 40 liters/hour for one and half hour. After carbon dioxide injection, 40 g of methoxy propanol was added. The carbonated composition was then heated under a vacuum of about 500 mm Hg to about 700 mm Hg to a temperature of 110° C. while the water and methanol were distilled off. The reaction product was then filtered by means of a vacuum pump using a filter aide. A clear stable low viscosity product was obtained. The shelf life stability of the product was tested for 6 months in a closed container and proved to be satisfactory.

Example 2

Same procedures were done as the previous example but 100 g of di-propylene glycol mono-methyl ether were used. The reaction product was a clear stable low viscosity product and was tested for 6 months in a closed container and again proved to be satisfactory.

Comparative Example 1

The reactor described above was charged with 180 g of 2-ethylhexanoic acid and 80 g of calcium hydroxide, and reacted with a flow of carbon dioxide such that the hourly mass ratio of carbon dioxide to calcium hydroxide was 1.1 in the presence of 20.5 g of triethylene glycol, 0.75 g of zinc octoate and 165 g of white mineral spirits 22.5 g of water were recovered from the reaction product. When the reaction ended, 423.35 g of a viscous reaction mass was produced. This product could not be filtered.

Comparative Example 2

Same composition as Example 1, except that the methanol and the whole amount of calcium hydroxide were added from the beginning and the carbon dioxide was directly injected without first removing the water of neutralization. The final reaction product was then heated to remove the water of neutralization. A viscous reaction mass, which could not be filtered, was obtained.

The invention claimed is:

1. A light color, shelf-stable liquid composition for preparing an overbased calcium carboxylate soap having a basicity index greater than 1 and not more than 4 comprising:
   at least one non-polar organic solvent,
   at least one polar organic solvent,
   between 30% and 90% by weight of $C_7$ to $C_{25}$ saturated carboxylic acids
   branched at carbon 2, and
   at least one $C_2$ to $C_6$ saturated carboxylic acids as a promoter.

2. The composition for preparing an overbased calcium carboxylate soap of claim 1, wherein said non-polar organic solvent is between 8% and 68% by weight of the total composition.

3. The composition for preparing an overbased calcium carboxylate soap of claim 2, wherein said polar organic solvent is between 1% and 60% by weight of the total composition.

4. The composition for preparing an overbased calcium carboxylate soap of claim 1, wherein said $C_7$ to $C_{25}$ saturated carboxylic acids branched at carbon 2 are selected from the group consisting of 2-ethylhexanoic acid, neoheptanoic, neodecanoic acid and neononanoic acid.

5. The composition for preparing an overbased calcium carboxylate soap of claim 1, wherein the $C_7$ to $C_{25}$ saturated carboxylic acids branched at carbon 2 comprises 2-ethylhexanoic acid.

6. The composition for preparing an overbased calcium carboxylate soap of claim 1, wherein the $C_2$ to $C_6$ saturated carboxylic acids are selected from the group consisting of acetic acid, propionic acid, butyric acid, isobutyric acid, pentanoic acid, valeric acid, isopentanoic acid, isohexanoic acid and neohexanoic acid.

7. The composition for preparing an overbased calcium carboxylate soap of claim 1, wherein said polar organic solvent comprises a mixture of at least one alcohol and at least one glycol or glycol ether.

8. The composition for preparing an overbased calcium carboxylate soap of claim, 1, wherein said $C_2$ to $C_6$ saturated carboxylic acid is between 1% and 20% by weight of the total composition.

9. A light color, shelf-stable liquid composition for preparing an overbased calcium carboxylate soap having a basicity index greater than 1 and not more than 4, comprising:
- at least one non-polar organic solvent
- at least one polar organic solvent
- between 25% and 90% by weight of $C_7$ to $C_{25}$ saturated carboxylic acids
- branched at carbon 2, and
- between 1% to 20% by weight of $C_2$ to $C_6$ saturated carboxylic acids.

* * * * *